United States Patent [19]

Joyce, Jr.

[11] 4,088,340
[45] May 9, 1978

[54] IMPACT ABSORBING VEHICLE COUPLING SYSTEM

[75] Inventor: Hardin Joyce, Jr., Springfield, Ill.

[73] Assignee: Fiat-Allis Construction Machinery, Inc., Deerfield, Ill.

[21] Appl. No.: 629,795

[22] Filed: Nov. 7, 1975

[51] Int. Cl.² .............................................. B60D 3/00
[52] U.S. Cl. ............................... 280/481; 293/DIG. 1
[58] Field of Search .................. 280/481, 477, 479 R, 280/479 A, 489; 293/DIG. 1; 172/272, 275, 292

[56] References Cited

U.S. PATENT DOCUMENTS

| 3,606,388 | 9/1971 | Campbell | 280/481 |
| 3,977,699 | 8/1976 | Wagatsuma | 280/477 |
| 4,018,452 | 4/1977 | Wagatsuma et al. | 280/481 |

FOREIGN PATENT DOCUMENTS

| 510,392 | 6/1976 | U.S.S.R. | 280/481 |

Primary Examiner—Robert R. Song
Assistant Examiner—John A. Pekar
Attorney, Agent, or Firm—August E. Roehrig, Jr.; Robert A. Brown; Harvey W. Rockwell

[57] ABSTRACT

A selectively actuable push-pull vehicle coupling to be utilized in assisting loading of a vehicle by pushing or pulling the vehicle being loaded. A push plate and tow bar are operatively connected through a common shock absorber which is utilized to cushion vehicle impact during both pushing and pulling operations.

9 Claims, 9 Drawing Figures

IMPACT ABSORBING VEHICLE COUPLING SYSTEM

BACKGROUND OF THE INVENTION

This invention relates in general to a hitching system for coupling vehicles and, in particular, to a hitching system which may be selectively utilized to push or pull a vehicle.

More specifically, this invention relates to a hitching system particularly adapted for use with tandem loading earth moving vehicles and adapted to cushion the impact incurred upon pushing or pulling the loading vehicle.

During the excavating of material, such as encountered in land leveling and various types of construction wherein earth moving vehicles are utilized to cut earth from a borrow site and move it to a fill site, scraper type vehicles which include a scoop or bucket, known as a bowl, are employed to cut the earth from the borrow site and carry it to the fill site for unloading. Maximum power requirements are needed during the filling or cutting portion of the operation when the scraper bowl is cutting the earth from the borrow site and loading the fill into the bowls to be conveyed to the fill site. In difficult soil conditions, the vehicle tires frequently slip and spin when the bowl is engaged in the filling operation, thereby dissipating power. Therefore, it has been common practice to utilize an assist vehicle, either a crawler tractor or a second scraper, at the borrow site to push against the rear or to pull at the front of the loading vehicle to supplement the power required for the loading or filling operation.

During tandem loading operation when a crawler tractor is utilized, such operation is wasteful of both equipment and manpower due to the fact that the crawler equipment must be on standby except during that period of time in which it is utilized to assist the scraper in the loading or cutting operation. Therefore, to eliminate the necessity of having to maintain a crawler type tractor to assist in the loading operations, scraper vehicles are used in tandem relationship. A pair of scrapers are coupled together such that a following scraper pushes against the rear of the leading vehicle in order to supplement the tractive effort of the forward vehicle during the cutting or loading operation. During such operation, the assisting or following scraper normally has its bowl clear of the ground and is used only to supplement the tractive effort of the forward or loading vehicle. When the forward vehicle has been loaded, the bowl is raised clear of the ground and the forward vehicle assists in loading the following vehicle in a similar operation.

To avoid requiring that the forward or loaded vehicle reverse position to push against what heretofore was the following vehicle, various hitches or couplings have been designed for both pushing and pulling operations. Upon the loading of the forward vehicle with the assistance of the following pushing vehicle, a hitch is utilized to engage a suitable hook on the rear portion of the forward vehicle to pull the following vehicle during loading. While various hitch assemblies which alternatively function as a push-type hitch and a pull-type hitch have been utilized, such devices have not proven effective over uneven terrain when one of the coupled vehicles may be at a substantially different elevation or at an angle relative to the other resulting in frequent disconnection. In addition, impact between the vehicles upon engagement or during tandem loading frequently causes damage to the vehicles and, therefore, in order to minimize such damage the engagement of the vehicles is frequently extremely time consuming.

SUMMARY OF THE INVENTION

It is, therefore, an object of this invention to improve push-pull vehicle hitches.

It is another object of this invention to improve push-pull vehicle hitches for relatively fast engagement of the vehicles while damping the impact of one vehicle with the other.

A further object of this invention is to absorb the initial shock and impact resulting from the engagement of the vehicles during both pushing and pulling of the vehicles to assist in the loading operation.

These and other objects are attained in accordance with the present invention wherein there is provided a selectively actuable push-pull vehicle coupling to be utilized in assisting loading of a vehicle by pushing or pulling the vehicle being loaded. A push plate and tow bar are operatively connected through a commom shock absorber which is utilized to cushion vehicle impact during both pushing and pulling operations.

DESCRIPTION OF THE DRAWINGS

Further objects of the invention together with additional features contributing thereto and advantages accruing therefrom will be apparent from the following description of one embodiment of the invention when read in conjunction with the accompanying drawings wherein.

DESCRIPTION OF A PREFERRED EMBODIMENT

Figure 1:
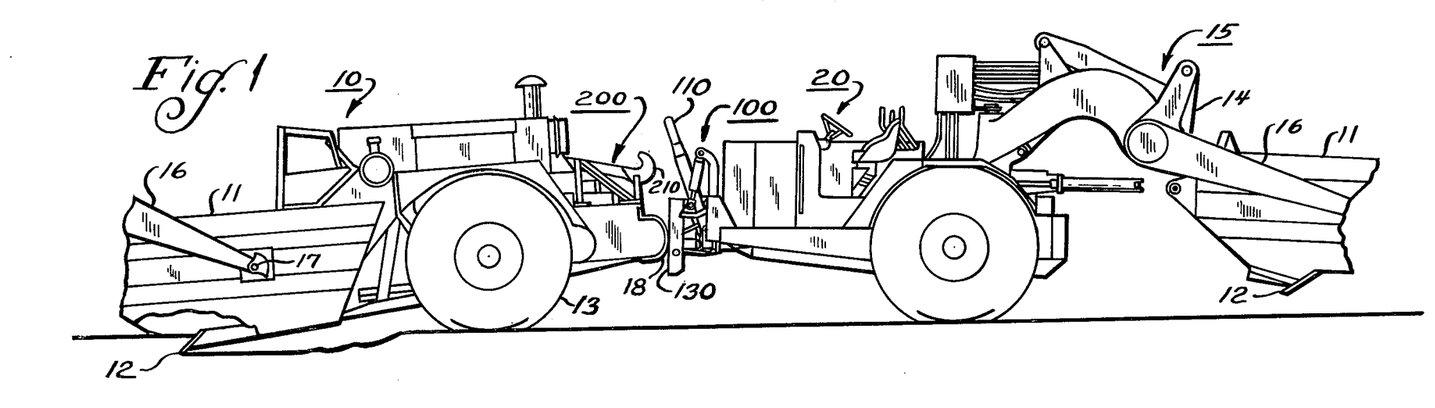
FIG. 1 is a side elevational view of two scraper vehicles utilizing the invention of this application in a pushing mode whereby the following scraper is assisting in loading the leading scraper by pushing.
Figure 2:
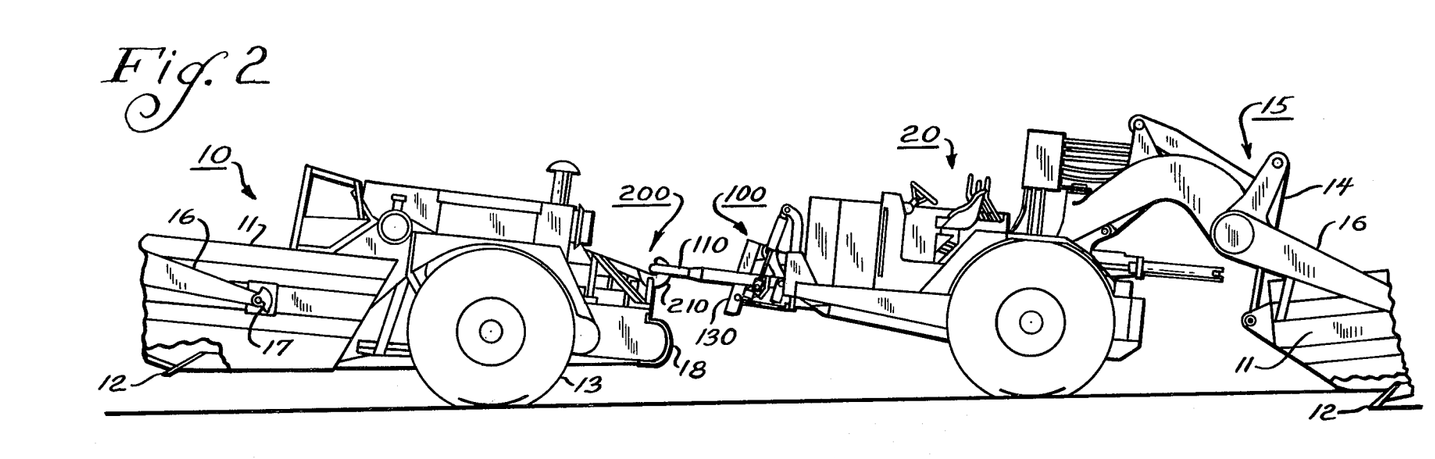
FIG. 2 is a side elevational view of two scraper vehicles utilizing the present invention in a pulling mode whereby the lead scraper is assisting the loading of the following scraper by pulling.

Referring now to FIGS. 1 and 2, there is shown an embodiment of the subject invention being utilized to couple two earth-moving vehicles, referred to as scrapers, for tandem loading the vehicles. Although this invention may be used as a coupling device for various vehicles, for convenience of illustration the preferred embodiment is described with reference to its use in coupling scrapers.

Scrapers 10 and 20, portions of which are illustrated in FIGS. 1 and 2, include a scraper bowl 11 supported at its rear end by a pair of wheels 13 (one of which is shown), and at its front end by a draft frame 15 having a pair of rearwardly extending legs 16 pivotally connected to the vertical side walls of the scraper bowl by a transverse pivot axis 17. The scraper bowl 11 includes a cutting edge 12 at the front end of the bottom which excavates a predetermined amount of material as the scraper passes over the ground. The amount of material removed as the scraper passes through the cut or borrow site is controlled by raising or lowering the cutting edge 12 carried at the front end of the scraper bowl. This positioning is effected by a pair of hydraulic jacks 14 interconnecting the draft frame 15 at the front or leading portion of the scraper bowl. The jacks 14 are expanded or contracted to determine the depth of cut of the cutting edge 12 with the material being excavated passing into the scraper bowl as the scraper is moved forwardly.

In the usual sequence of tandem loading, a following scraper 20 is utilized to assist in push-loading a forward scraper 10, as shown in FIG. 1. The following scraper 20 is unloaded and has its cutting edge 12 raised in order to provide the maximum pushing force against a bumper 18 of the leading scraper 10 during the tandem push-loading operation. The pushing force is applied through a push plate 130 of a push-pull coupling or hitch assembly 100 carried on the front end of each scraper. After the lead scraper 10 has been filled, a tow bar or bail 110 is lowered to engage a hook 210 of a hook assembly or coupling 200 carried at the rear end of each scraper so that the following scraper 20 may begin tandem pull-loading operation.

As shown in FIG. 2, when the bail 110 and hook 210 are engaged the operator of the previously loaded forward scraper 10 raises the cutting edge 12 of the forward scraper bowl so that maximum pulling power can be exerted to tandem pull-load the following scraper 20. Tandem loading performed in this sequence allows continuous operation since during push-loading the push-plate 130 of the following scraper 20 is contacting the bumper 18 of the forward or lead scraper 10. Upon completion of push-loading, the scrapers are in a position to engage their respective hook 210 and bail 110 so that as loading of the forward scraper 10 is completed the following scraper 20 can immediately begin its loading operation.

The push-pull coupling or hitch 100 which allows tandem loading of the scrapers is supported from each scraper frame 21 by an upper and lower support bar 101 and 103, respectively, which extend transversely between the scraper frame members, as best shown in FIGS. 3, 5, 6 and 7. The upper support bar 101 is supported between the scraper frame members 21 by means of a pair of gusset plates 22 appropriately secured to the frame members as by welding.

The push plate 130, used in the tandem push-loading operation, is pivotally supported by a pivot rod 120 carried by a pair of frame support bars 105 which are secured to upper support bar 101 to form a pivot common with a bail spring lever 111 used during the tandem pull-loading operation. The common pivot for push plate 130 and bail spring lever 111 is for a purpose to be hereinafter described in detail. The push plate 130 is pivotally connected to the common pivot rod 120 by a pair of support arms 131 appropriately secured, as by welding, in spaced relation to the reverse side of the pushing face with each support arm 131 being pivotally supported about the common pivot rod 120.

Figures 3, 4:
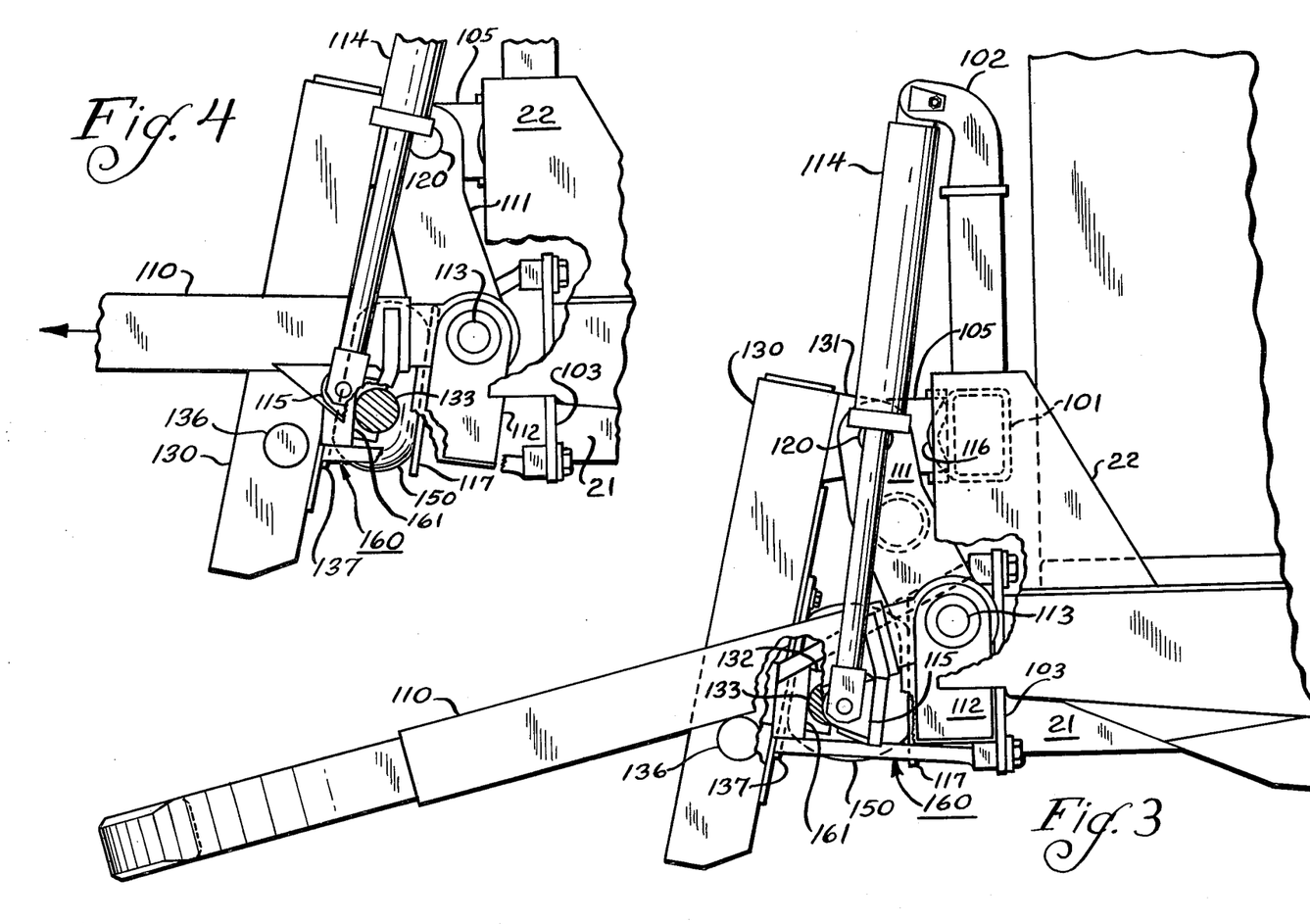
FIG. 3 is a side profile view of the vehicle coupling in an uncoupled mode with portions broken away to better illustrate the operation of the shock absorber.
FIG. 4 is a side profile view of the vehicle coupling during pulling operation to better illustrate the shock absorber action.
Figure 5:
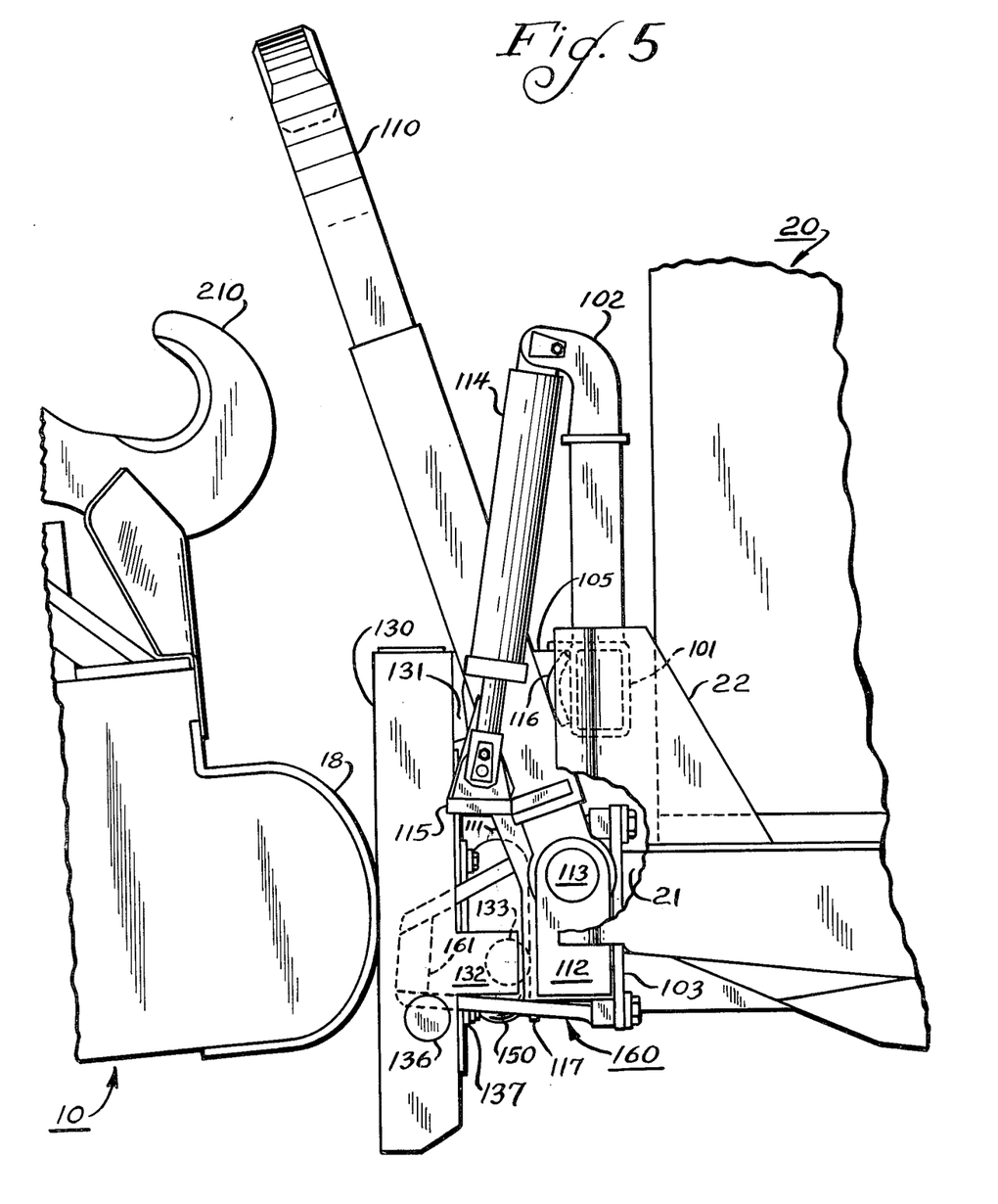
FIG. 5 is a side profile view of the vehicle coupling in the push mode with portions broken away to better illustrate the components thereof.
Figure 6:
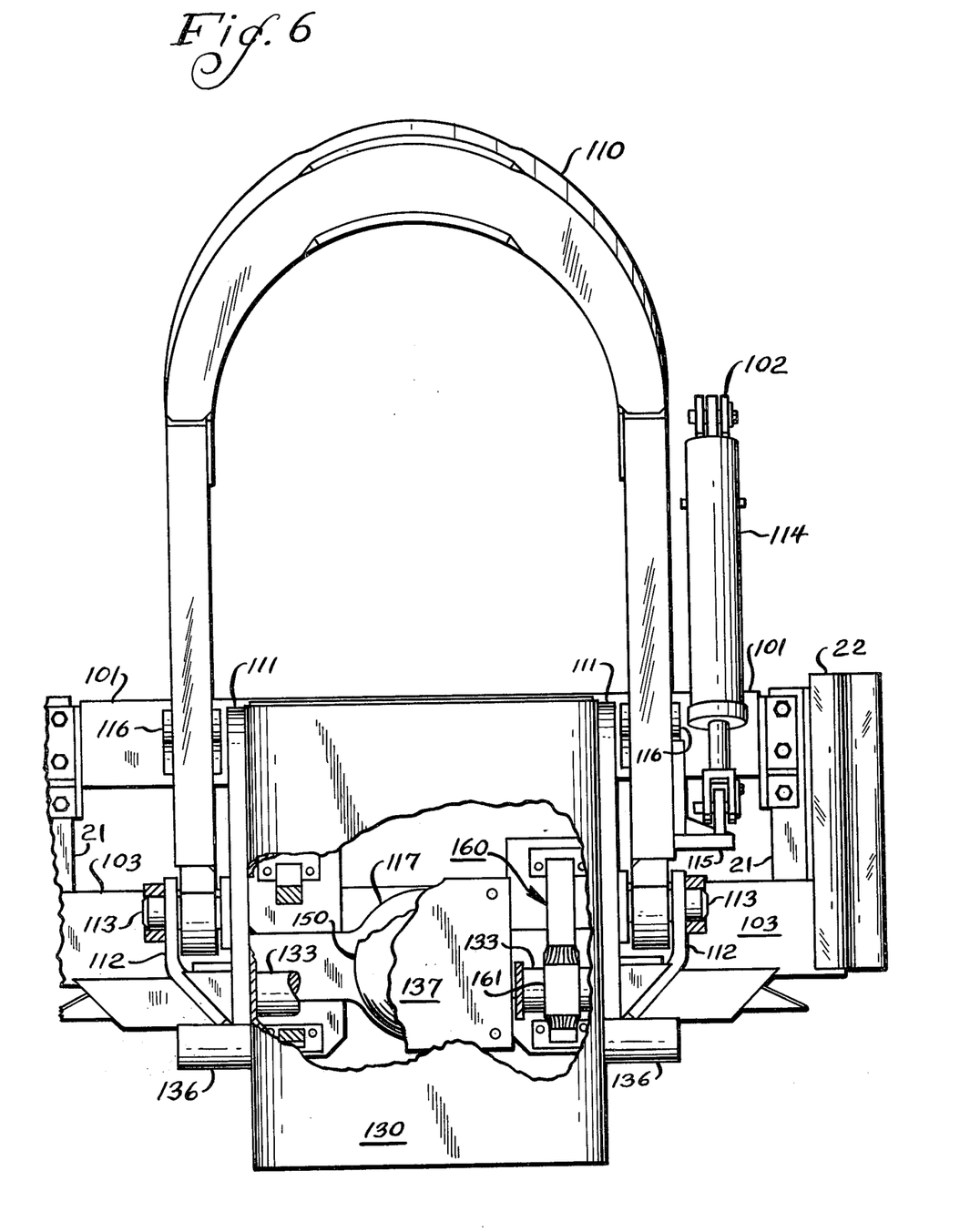
FIG. 6 is a frontal horizontal profile of the vehicle coupling in the push mode with portions broken away to better illustrate the components.
Figure 7:
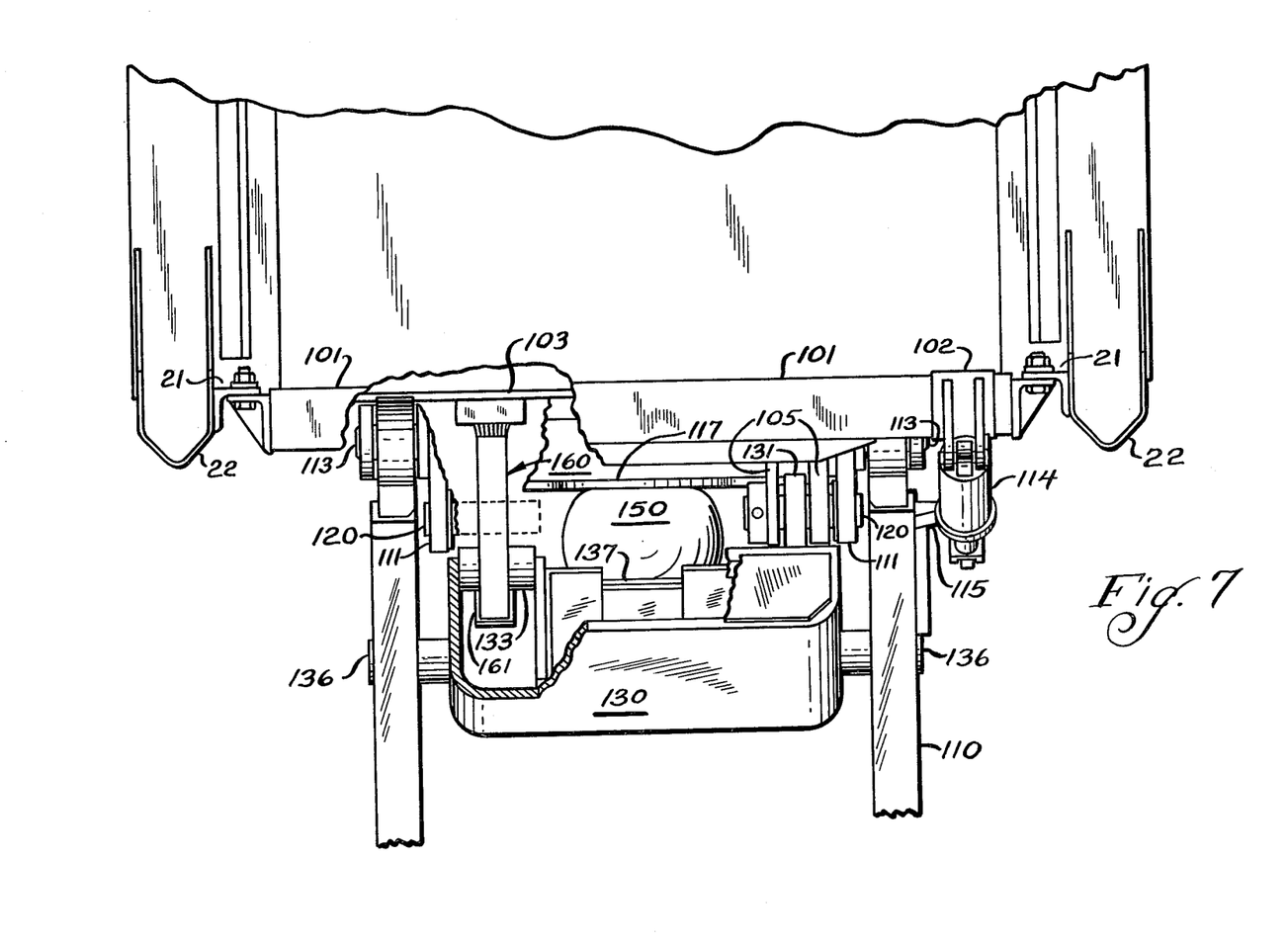
FIG. 7 is a top horizontal profile view of the vehicle coupling in the pull mode with portions broken away to better illustrate the components thereof.

The bail 110 is formed in a generally U-shaped configuration. The open ends of the U are each pivotally connected to the bail spring lever 111 each having an upturned end 112 through which a pivot pin 113 passes to connect the bail 110 with the spring levers. The bail spring levers 111 are each pivotally supported at the opposite end from the pivot rod 120 which forms the pivot common to the spring levers 111 and the push plate support arms 131. In this manner the push plate 130 is pivotally supported from the common pivot rod 120 for movement in a counter-clockwise direction as seen in FIGS. 4 and 5 and the U-shaped bail 110 is supported from the common pivot rod 120 for pivotal movement in a clockwise direction as seen in the same FIGS.

When the push plate 130 or the bail 110 are engaged for tandem loading, the initial impact of the coupling creates substantial loading forces on the mechanical components of the push/pull hitch 100. This impact loading of the hitch assembly frequently results in damage to the hitch coupling. Therefore, in order to dissipate the forces encountered during impact between the two vehicles, a shock absorber or dampener 150 is used to absorb or dissipate the impact load.

The shock absorber 150 is connected to and positioned between a cross beam brace plate 117 carried between the bail spring levers 111 and a pressure plate 137 appropriately secured to the back or rear portion of the push plate 130. The shock absorber or impact dampener 150 is a rubber spring of the type manufactured by Lord Manufacturing Company of Erie, Pennsylvania and sold under the name Lastosphere. An appropriate model has been found to be model LS-5000-1. The positioning or carrying of the shock absorber 150 between the cross beam brace plate 117 and the pressure plate 137 allows the shock absorber to be utilized in both push and pull tandem loading. As will be explained in detail hereinafter, pivotal movement of the push plate 130 in a counter-clockwise direction (as best shown in FIG. 5) about the common pivot support 120 will compress the shock absorber dampening the impact loading which occurs during the tandem push-loading operation. The clockwise movement of the bail spring levers 111 about the common pivot support 120 (best shown in FIG. 4) compresses the shock absorber during impact loading incurred by tandem pull-loading.

After the initial impact of the two tandem-loading vehicles has been absorbed by the shock absorber 150, it is then desired to establish a solid contact between the two vehicles during the pushing or pulling operation. Referring again to the tandem push-loading operation (shown in FIGS. 1, 5, and 6) during such loading the coupling bail 110 is raised and held in its uppermost position, as shown, out from intereference when the push plate 130 engages the rear bumper 18 of the forward scraper.

Raising of the bail 110 about the pivot connection 113 is effected by means of a hydraulic cylinder 114 having a retractable plunge rod connected to a bracket 115 fastened to the bail 110 such that extension and retraction of the plunge rod will cause the bail to pivot in an arc about the pivot support connection 113. The end of the hydraulic cylinder 114 opposite to the bracket connection is secured on one side of the push/pull hitch 100 by a bifurcated support arm 102 extending upwardly from the frame-supported upper support bar 101. The limits of the arcuate path of the bail 110 are defined at the upper end by a pair of stops 116 appropriately secured to the upper support bar 101 and at the lower end by a pair of protruding cylindrical stop bars 136 extending outwardly from the side portions of the push plate 130.

To effect solid contact between the tandem push-loading scrapers after the initial impact has been dissipated, the push plate 130 is formed with rearwardly extending stop supporting portions 132 each of which has secured thereto a cylindrically shaped stop 133. During tandem push-loading operation, the bail 110 is rotated upwardly out of interference with the engagement of the two vehicles and held in that position by means of the hydraulic cylinder 114. The shock absorber 150 holds the lower end of each of the bail spring lever arms 111 and cross beam brace 117 against the frame-connected lower support bar 103 when push-loading to provide a solid support against the scraper frame itself.

Upon engaging the rear bumper 18 of the forward vehicle with the push plate 130, the push plate will be pivoted in a counter-clockwise direction (FIG. 5) compressing the shock absorber 150 between the cross beam brace plate 117 and the pressure plate 137 secured to the rear of the push plate. This absorbing or dissipating of the initial impact dampens the movement of the push plate 130 in its counter-clockwise pivot allowing the push plate to pivot until such time as the shock absorber is compressed and the cylindrically-shaped stops 133 carried by the extending stop support portions 132 of the push plate engage the cross beam brace 117. In this manner the initial impact is absorbed, but solid contact is achieved after the shock absorber 150 has dissipated the impact by being sufficiently compressed to allow the cylindrically-shaped stops 133 to engage the cross beam brace 117 which is held in contact with the vehicle frame through lower support bar 103.

After the lead or forward scraper 10 has been loaded, the following scraper 20 lowers its bail 110 to engage the hook assembly 200 at the rear of the forward scraper. The forward scraper 10 raises its scraper bowl and cutting edge, and the following scraper 20 lowers its cutting edge 12 to begin tandem pull-loading operation. Engagement of the bail 110 with the hook assembly 200 causes the bail spring lever arms 111 to rotate in a clockwise direction (FIG. 4) out from engagement with the vehicle-frame-supported lower support bar 103. Such movement compresses the shock absorber 150 between the cross beam brace plate 117 carried by the bail spring lever arms 111 and the pressure plate 137 on the rear face of the push plate 130. In this manner the initial shock or impact loading of the two vehicles is dissipated by compression of the shock absorber 150. However, again, upon dissipation of the impact load it is desired to have a solid connection between the two vehicles.

As the bail spring lever arms 111 are moved in a clockwise direction (FIG. 4) about pivot rod 120, the like movement of the cross beam pressure plate which extends therebetween against the shock absorber 150, will cause the push plate 130 to move in a clockwise direction about pivot rod 120 until a prdetermined limiting stop is reached. To effect a positive stop for clockwise rotation of the push plate somewhat U-shaped brace system 160 is secured to the vehicle-frame-connected lower support bar 103 and extends outwardly therefrom. Clockwise movement of the cross beam brace plate 117 against the shock absorber 150 causes the rear portion of the cylindrically shaped stops 133 to engage a bottom portion 161 of the bracing system 160. The initial impact forces occurring during engagement of the bail 110 and hook 210 are dissipated by compression of the shock absorber 150 until such time as the cross beam brace plate 117 engages the rear portion of the cylindrical stops 133 which at that time are in abutment with the flat portion 161 of the bracing system to form a solid connection with the vehicle frame.

As previously described, when tandem pull-loading, the bail 110 of the following scraper 20 engages the hook 210 carried by the rear portion of the forward or leading scraper 10. The bail 110 is lowered during tandem push-loading operation and when the cutting edge of the lead scraper 10 is lowered, the forward scraper will begin to tandem pull-load the following scraper. The bail 110 of the following scraper engages the hook 210 of the lead scraper for coupling the pulling force.

Figure 8:
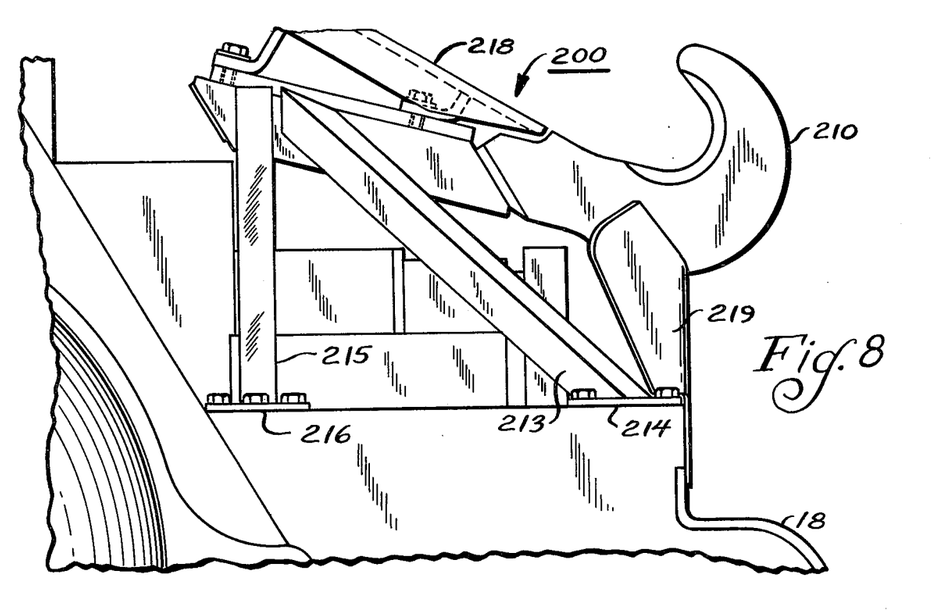
FIG. 8 is a side profile view of a coupling hook utilized to engage a portion of the vehicle coupling during pulling operation.
Figure 9:
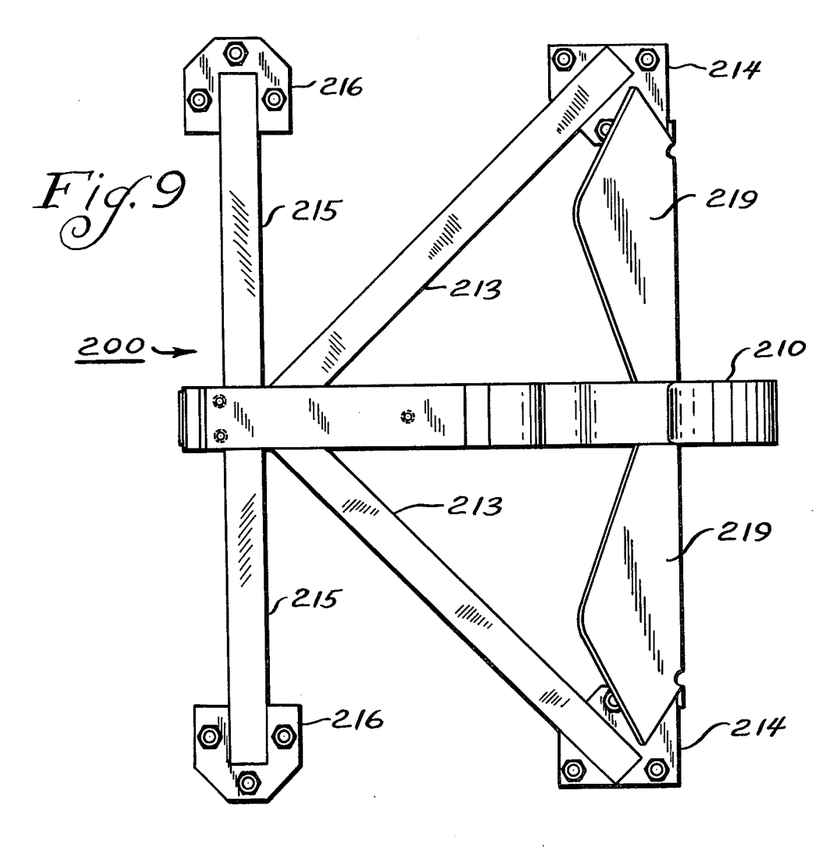
FIG. 9 is a top horizontal profile view of the coupling shown in FIG. 8.

Referring to FIGS. 8 and 9, a bearing plate 218 secured to the forward portion or beam of the hook allows the tandem push-loading operation to continue until such time as the forward scraper is loaded, when the bail 110 of the following scraper is lowered. During the pushing contact the bail 110 is lowered onto the bearing plate 128 and during the transition from tandem push-loading to tandem pull-loading the bail slides back along the bearing plate 128 into engagement with the hook 210 effecting a smoother transition in the tandem loading mode.

The hook 210 is carried on the rear portion of the forward scraper adjacent the rear bumper 18 by compression load diagonal braces 213 secured, as by welding, to the forward portion or beam of the hook 210 at one end and to plate 214 attached to the rear portion of the scraper at the other. The forward portion or beam of the hook is supported by tensile braces 215 secured to the hook beam at one end and to support plates 216 at the other. Securing the compression and tensile support braces 213 and 215, respectively, to the hook 210 in this manner transmits the pulling force coupled through the bail 110 of the following scraper to the forward scraper frame through the combination of compressive and tensile truss-like members. The bearing plate 218 carried on the upper portion of the hook beam supports the bail 110 and allows it to slide along the hook beam providing roll freedom. Guard plate 219 secured to the support plate 214 at each end and to a lower portion of the hook 210 at the center, protects the rear transmission from damage.

While the invention has been described to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. An impact dissipating coupling system for tandem pushing or pulling of vehicles including
    yieldable pushing means to be carried on a vehicle in a position for effecting tandem pushing,
    said yieldable pushing means supported for pivotal movement upon tandem pushing engagement with another vehicle,
    shock absorber means operable to dissipate impact effected by engagement with another vehicle,
    said yieldable pushing means and said shock absorber means operatively connected such that said pivotal movement will operate said shock absorber means to dissipate impact effected by pushing engagement with another vehicle, and
    yieldable bail means to be carried on the same vehicle carrying said yieldable pushing means for engagement by another vehicle to effect tandem pulling,
    said yieldable bail means supported for pivotal movement in the direction of the applied pulling force upon tandem pulling engagement with another vehicle and operatively connected to said shock absorber means such that said pivotal movement will operate said shock absorber means to dissipate impact effected by pulling engagement with another vehicle.

2. A selectively operable coupling for use on a vehicle to effect pushing or pulling of another vehicle comprising
    pushing means carried by a vehicle for applying a pushing force against another vehicle,
    said pushing means supported on the vehicle for pivotal movement in a direction opposed to the pushing force during application of the pushing force against the other vehicle,
    a compressible shock absorber for dissipating impact incurred by coupling the vehicles,
    said pushing means operatively connected to said compressible shock absorber to compress said shock absorber upon said pivotal movement for dissipating impact incurred by application of the pushing force against the other vehicle, and
    tow bar means carried by the vehicle carrying said pushing means for receiving a pulling force applied against the vehicle,
    said tow bar means operatively connected to said compressible shock absorber,
    said tow bar means pivotally supported from the vehicle for movement in the direction of the applied pulling force to compress said compressible shock absorber upon said pivotal movement for dissipating impact incurred by application of the pulling force against the vehicle.

3. An impact absorbing vehicle coupling for use in tandem pushing or pulling of vehicles comprising
    pushing means pivotally supported on a vehicle in a position for limited pivotal movement in a direction opposite to the direction of a pushing force applied during tandem pushing of another vehicle,
    tow bar means selectively positionable for engagement by another vehicle to receive a pulling force for tandem pulling and pivotally supported on the vehicle for limited pivotal movement in the direction of a pulling force applied during tandem pulling by another vehicle,
    said pushing means and said tow bar means supported on the vehicle by a common pivot,
    impact absorbing means operatively connected between said pushing means and said tow bar means compressible upon said pivotal movement thereof for dissipating impact incurred during tandem pushing and pulling, and
    stop means conjointly engagable by said pushing means and said tow bar means for limiting the pivotal movement thereof upon compression of said impact absorbing means.

4. The apparatus of claim 3 wherein said tow bar means comprises a bail pivotally supported by a pair of lever arms pivotally connected to said pivot common with said pushing means.

5. The apparatus of claim 4 wherein said bail is pivotally connected at one end of each of said lever arms and another end of each of said lever arms is pivotally connected to said common pivot.

6. The apparatus of claim 4 wherein said tow bar means further includes bail actuating means coupled to said bail for effecting arcuate movement thereof into and out from a position for engagement by another vehicle.

7. The apparatus of claim 3 wherein said impact absorbing means comprises an elastomeric shock absorber carried by said pushing means and said tow bar means and compressible upon the pivotal movement thereof to dissipate impact forces incurred during tandem pushing and pulling.

8. The apparatus of claim 3 wherein said stop means includes
    bracing means connected to the vehicle and extending outwardly therefrom defining a closed peripheral surface for engagement by a stop member to limit movement thereof,
    a stop member carried by said pushing means positioned within said closed peripheral surface to engage said bracing means for limiting the pivotal movement of said tow bar means.

9. The apparatus of claim 8 wherein said tow bar means includes
    a bail pivotally supported by a pair of lever arms pivotally connected to said pivot common with said pushing means, and
    a cross brace extending between said lever arms and positioned for engagement with the vehicle upon pivotal movement of said pushing means to define the limits of the pivotal movement thereof.

* * * * *